United States Patent
Vanzini et al.

(10) Patent No.: US 7,255,282 B2
(45) Date of Patent: *Aug. 14, 2007

(54) PCMCIA-COMPLAINT SMART CARD SECURED MEMORY ASSEMBLY FOR PORTING USER PROFILES AND DOCUMENTS

(75) Inventors: Giorgio J. Vanzini, Seattle, WA (US); Gregory Burns, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/275,210

(22) Filed: Dec. 19, 2005

(65) Prior Publication Data

US 2006/0102716 A1 May 18, 2006

Related U.S. Application Data

(63) Continuation of application No. 09/304,035, filed on May 3, 1999, now Pat. No. 7,036,738.

(51) Int. Cl.
G06K 7/00 (2006.01)
(52) U.S. Cl. ............... 235/486; 235/375; 235/492
(58) Field of Classification Search ............ 235/486, 235/375, 492, 380; 705/41; 710/100, 103, 710/305
See application file for complete search history.

(56) References Cited

U.S. PATENT DOCUMENTS

| | | | |
|---|---|---|---|
| 5,629,508 A | 5/1997 | Findley, Jr. et al. | |
| 5,663,553 A | 9/1997 | Aucsmith | |
| 5,679,007 A | 10/1997 | Potdevin et al. | |
| 5,860,157 A | 1/1999 | Cobb | |
| 5,907,620 A | 5/1999 | Klemba et al. | |
| 5,955,722 A | 9/1999 | Kurz et al. | |
| 6,011,741 A | 1/2000 | Wallace et al. | |
| 6,135,786 A * | 10/2000 | Johnson et al. | 439/76.1 |
| 6,178,507 B1 | 1/2001 | Vanstone et al. | |
| 6,215,656 B1 * | 4/2001 | O'Neal et al. | 361/686 |
| 6,439,464 B1 * | 8/2002 | Fruhauf et al. | 235/492 |
| 6,567,273 B1 * | 5/2003 | Liu et al. | 361/737 |
| 6,893,268 B1 | 5/2005 | Harari et al. | |
| 6,981,068 B1 | 12/2005 | Harari et al. | |

* cited by examiner

*Primary Examiner*—Ahshik Kim
(74) *Attorney, Agent, or Firm*—Lee & Hayes, PLLC

(57) ABSTRACT

A portable profile carrier stores and securely transports a user's profile and data files from one computer to the next. The profile carrier is a two-component assembly comprising a smart card and a PCMCIA smart card reader. The reader is physically constructed in a form factor of a PCMCIA card and has a slot to receive the smart card. The reader has a smart card interface and controller to facilitate data communication with the smart card. The reader is equipped with data memory (e.g., flash memory) to store the user profile and data files. Access to the data memory is protected by the smart card. The composite profile carrier enables access to the user profile on the flash memory when the smart card is present and the user is authenticated, and disables access when the smart card is removed or the user is not authenticated.

11 Claims, 4 Drawing Sheets

PCMCIA-COMPLAINT SMART CARD SECURED MEMORY ASSEMBLY FOR PORTING USER PROFILES AND DOCUMENTS

RELATED APPLICATIONS

This continuation application claims priority to U.S. patent application Ser. No. 09/304,035 filed on May 3, 1999, now U.S. Pat. No. 7,036,738 to Vanzini et al., entitled, "PCMCIA-compliant Smart Card Secured Memory Assembly For Porting User Profiles and Documents."

TECHNICAL FIELD

This invention relates to systems and methods for transporting user profiles and data files from one computer to another. More particularly, this invention relates to a portable profile carrier that enables a user to securely store and transport a user profile and personal data files, while allowing the user to access the profile and data files during log on processes at a standalone or networked computer so that the computer retains the same 'look and feel' of the user's desktop and setup.

BACKGROUND

Profiles are used by operating systems to configure operating characteristics of a computer (e.g., user interface schema, favorites lists, etc.) according to user-supplied preferences and provide storage for the user's personal data files (e.g., files on the desktop or in the user's "my documents" folder. Windows NT operating systems from Microsoft Corporation supports two types of profiles: local profiles and roaming profiles. A local profile is stored and loaded from a fixed location on the local computer. The profile remains at the computer, and is not portable to another computer. Thus, if the user logs onto another computer, a new profile is created for that user from a default profile. As a result, the user ends up with different profiles on each machine that he/she logs onto and hence, each machine looks and feels differently.

A roaming profile travels with the user in a networked environment and is made available to the user regardless of which machine the user logs onto. FIG. 1 shows a client-server architecture 20 that implements conventional roaming profiles. The architecture 20 includes a server 22 connected to serve a client 24 over a network 26. The server 22 has an operating system 28 and a profile store 30 that holds various user profiles. The profiles are associated with the users via a passcode. The client 24 runs an operating system 32.

When the user logs onto the client 24, the user is initially prompted for a user name, domain name, and password. The domain name is used to identify the server 22 and the user name is used to locate a corresponding user profile from the profile store 30. If a profile exists (i.e. the user name is known to the server), the password is used in a challenge response exchange with the server to verify the identity of the user. If the user provided the correct password for the given user name the user's profile is downloaded from the server 22 to the client 24 and used to configure the client according to the user's preferences.

If additional security is warranted, the architecture may further include smart card tokens. The user is assigned a personal smart card and inserts the smart card into a card reader at the client. In this case the user name, domain name, and password is stored on the smart card. Instead of the user entering this information the user enters a passcode that unlocks the card and makes the information available to the client which then performs the logon process as described above.

One drawback with the roaming architecture is that users have only limited control over their own profiles. A user cannot, for instance, establish a roaming profile without the assistance of a network administrator. The administrator must assign a roaming profile pathname in the user's account on the domain server. The user then has the option to indicate on each machine whether to use a roaming profile or a local profile.

Another drawback with roaming profiles is that the architecture restricts roaming to clients connected to the network 26 with access to the domain server and the profile server 22. The architecture does not allow a user to access his/her profile on a home computer or other standalone computer that is not network attached.

Accordingly, there is a need for a portable device that securely transports a user's profile and related documents (My Documents) to various machines, regardless of whether the machines are connected or standalone. The inventors have developed such a device.

SUMMARY

This invention concerns a portable profile carrier that stores and securely transports a user's profile and personal user data files from one computer to the next.

The profile carrier is a two-component assembly comprising a storage card (e.g., smart card) and a card reader. The reader is physically constructed in a form factor of a PCMCIA card and has a slot to receive the storage card. The reader has a card interface and controller to facilitate data communication with the storage card.

According to an aspect of this invention, the reader is equipped with data memory (e.g., flash memory) to store the user profile and data files. The storage card protects access to the data memory. The composite profile carrier alternately enables access to the user profile on the flash memory when the card is present and the user is authenticated, while disabling access when the card is removed or the user is not authenticated within a certain time period.

In one implementation, the storage card is implemented as a smart card having processing capabilities. The card reader is implemented as a smart card reader. The profile assembly is assigned a pair of public and private keys, with the public key being stored on the smart card reader and the private key being kept on the smart card. The smart card also stores a passcode that is unique to the user.

To access the contents in the flash memory, the user assembles the card reader and smart card and inserts the assembled carrier into a PCMCIA device reader at the computer. The user is prompted to enter a passcode and the smart card authenticates the user by comparing the user-supplied passcode to the stored passcode. Assuming that the user is legitimate, the smart card then authenticates the smart card reader by determining whether the public key is complementary with the private key. If it is, access to the user profile and data files on the flash memory is permitted.

DETAILED DESCRIPTION

This invention concerns a portable profile carrier for transporting a user profile from one computer to the next in order to configure each computer according to user preferences. The profile carrier is equipped with sufficient memory to hold data files as well as the user profile. In one implementation, the profile and data files are secured, in part, using cryptographic techniques. Accordingly, the following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (second edition 1996).

System

Figure 1:
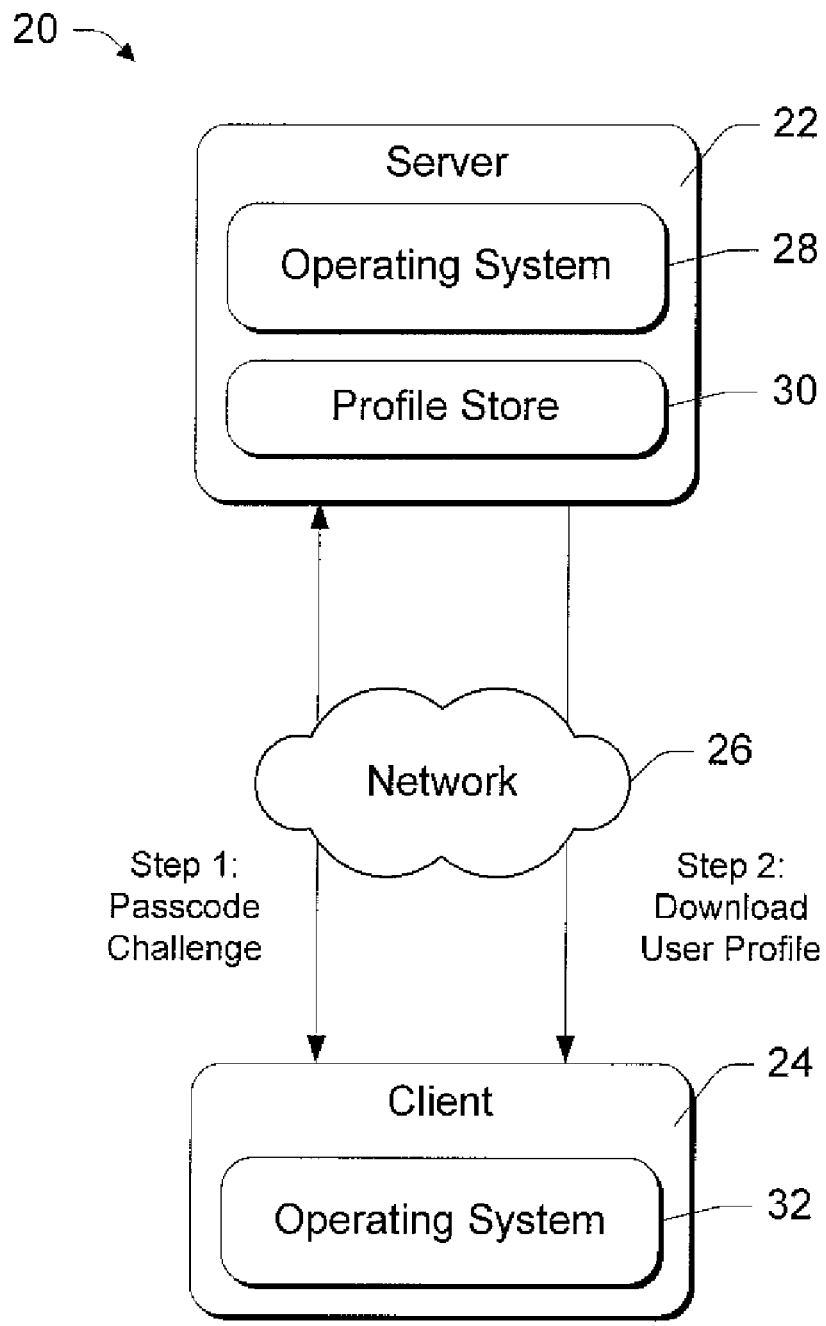
FIG. 1 is a block diagram of a prior art client-server system that supports roaming profiles from one network client to another.
Figure 2:
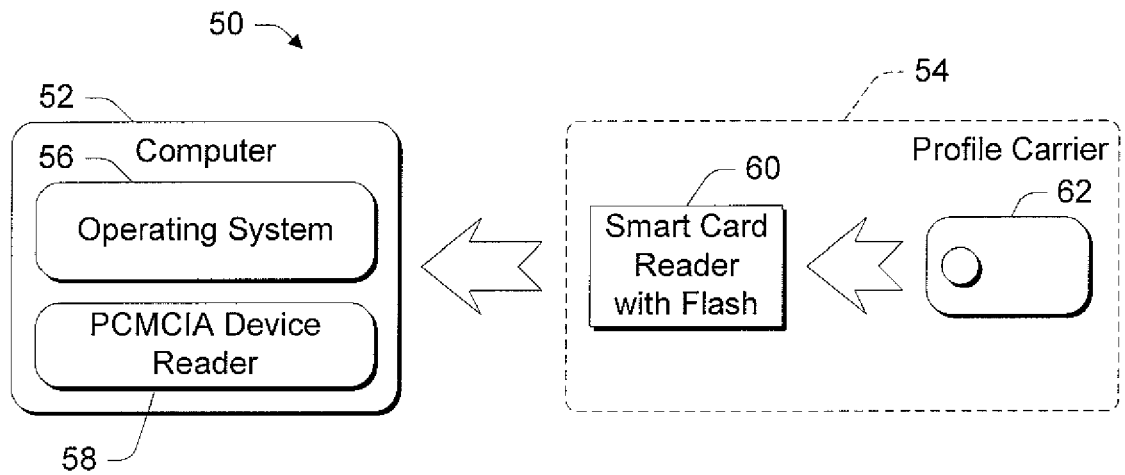
FIG. 2 is a block diagram of system having a portable profile carrier that securely transports user profiles and data files from computer to computer. The portable profile carrier, in conjunction with the computer operating system, enables authenticated access to the profiles and documents at a computer, regardless of whether the computer is standalone or networked.

FIG. 2 shows a computer system 50 having a computer 52 and a portable profile carrier 54. The computer 52 has an operating system 56 and a PCMCIA (Personal Computer Memory Card Interface Association) device reader 58 that is capable of reading PCMCIA cards, which are also referred to as PC cards, The computer may be configured as a general-purpose computer (e.g., desktop computer, laptop computer, personal digital assistant, etc.), an ATM (automated teller machine), a kiosk, an automated entry system, a set top box, and the like. The machine 52 may be a standalone unit or networked to other computers (not shown).

The profile carrier 54 stores a user's profile in a secured medium that can be conveniently transported. The profile consists of user information that can be used to configure computer 52 according to selected preferences and schema of the user. The profile contains essentially all of the information that is useful or personal to the user. For instance, a profile might include a user's name, logon identity, access privileges, user interface preferences (i.e., background, layout, etc.), mouse control preferences (i.e., click speed, etc.), favorites lists, personal address book, the latest electronic mail (sorted according to user criteria) and so forth. One can also envision that application tokens or keys can be stored, and that will allow the user to access or use the applications for which he/she has tokens or keys.

The profile carrier 54 is an assembly of two components: a card reader 60 and a storage card 62. At its most basic form, the storage card 62 has a memory to store a passcode associated with the user. Higher forms of the storage card can be implemented, such as an integrated circuit (IC) card that has both memory and processing capabilities. In particular, the storage card 62 can be implemented as a smart card equipped with private memory for storing private keys (or other user secrets) and processing capabilities, including rudimentary cryptographic functionality (e.g., encryption, decryption, signing, and authentication). Smart card technology enables utilization of private keys without exposing them to the external world.

The card reader 60 provides an interface to read and write data to the storage card 62. The card reader 60 is preferably implemented as a PCMCIA (but could also be implemented via other means, e.g. via Universal Serial Bus, aka USB) smart card reader that is constructed in a form factor of a PCMCIA card so that it may be compatibly received by the PCMCIA device reader 58 at the computer 52. According to an aspect of this invention, the smart card reader 60 is equipped with data memory, such as flash memory, to hold the user's profile and other data files.

According to this architecture, the two-component profile carrier forms a smart card secured memory assembly that alternately enables access to the user profile on the reader-based flash memory when the smart card is present, while disabling access to the user profile when the smart card is removed. The smart card is associated with the user (e.g., via a passcode, like a ATM card) to ensure that only the legitimate user can access the smart card. In addition, the smart card reader 60 and smart card 62 are associated with one another (e.g., by sharing a public/private key pair) to securely link the legitimate user to the user profile and files stored in the flash memory of the smart card reader 60.

Portable Profile Carrier

Figure 3:
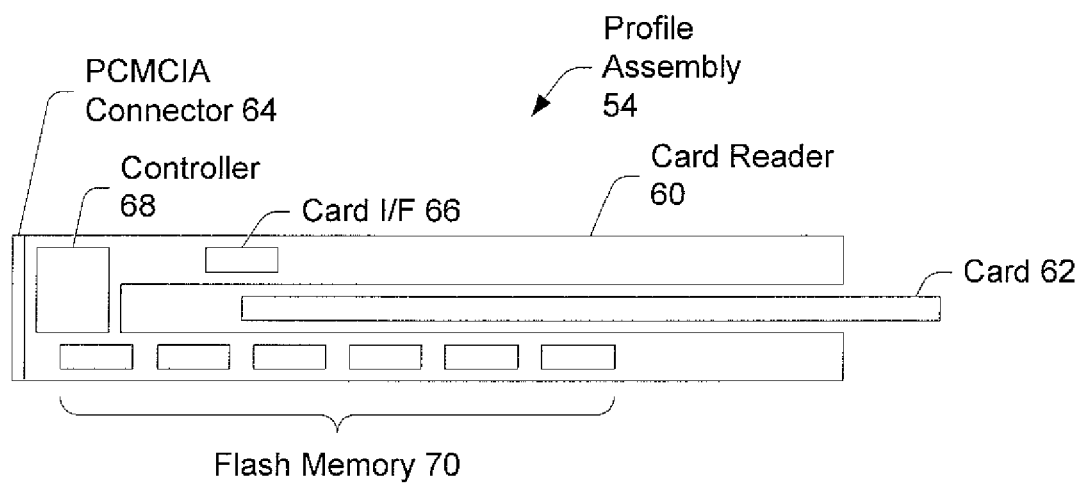
FIG. 3 is a diagrammatic view of a composite profile carrier that includes a smart card reader and a smart card.

FIG. 3 shows the profile assembly 54 in more detail. The smart card reader 60 is sized according to a PCMCIA form factor and includes a PCMCIA compatible connector 64 to accommodate insertion into and communication with the PCMCIA device reader 58 at the computer 52. The smart card reader 60 defines a slot to receive the smart card 62, whereby the smart card 62 can be alternately inserted into the reader slot or removed from the reader slot. When inserted, contacts on the smart card align with an interface 66 in the smart card reader 60 to allow communication between the smart card and reader. The smart card reader 60 also has a controller 68 coupled between the card interface 66 and connector 64 to facilitates data communication between the computer 52 and the smart card 62.

The smart card reader 60 described thus far is of conventional design. There are existing smart card readers with a PCMCIA form factor Examples of such smart card readers for PCMCIA are made by SCM Microsystems.

Unlike conventional smart card readers, however, smart card reader 60 is equipped with additional data memory 70 to hold the user profile and user files. The data memory can be implemented as flash memory, on the order of currently up to 128 MB, to hold a substantial amount of user data. The data memory 70 is coupled to the controller 68 via a data bus (not shown) to enable access to the data.

Figure 4:
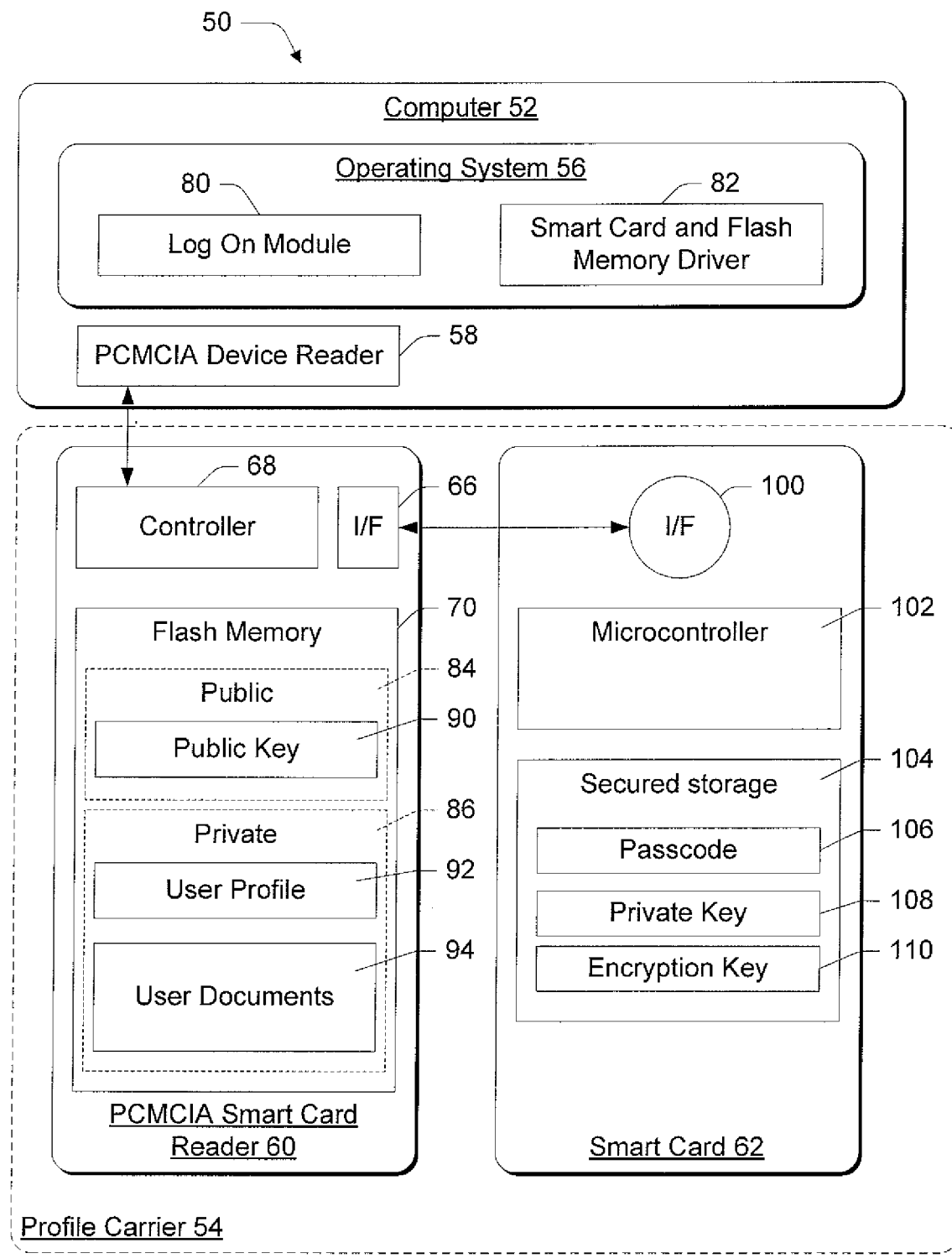
FIG. 4 is a block diagram of the system components, including the computer operating system, smart card, and smart card reader.

FIG. 4 shows functional components in the computer system 50. Computer 52 includes operating system 56 and reader 58. The operating system 56 has a logon module 80 to facilitate the user logon process. For a Windows NT operating system from Microsoft Corporation, the logon module 80 would be a modified version of the dynamic link library "msgina.dll", a component used by the user logon facility "winlogon.exe".

The operating system 56 also has a smart card and flash memory driver 82. The composite driver 82 is capable of detecting whether the device inserted into the PCMCIA reader 58 is a "combo" device that includes both flash memory and a smart card. The modified logon module ("msgina.dll") is designed to recognize that a profile assembly 54 has been inserted into the PCMCIA reader 58 (or alternatively, has established a USB connection). For discussion purposes, the modified logon module for handling the profile assembly will be referred to as "picoauth.dll". Logon procedures are described below under the heading "Portable Profile Operation", with reference to FIG. 5.

With continuing reference to FIG. 4, the profile assembly 54 comprises the smart card reader 60 and smart card 62. The smart card reader 60 has connector 64, card interface 66, controller 68, and flash memory 70. A multi-bit bus (not shown) connects the components. The flash memory 70 is partitioned into a public area 84 and a private area 86. A public key 90 is stored in the public area 84 of the flash memory 70 and can be exported from the smart card reader 60. The public key 90 is from a public/private key pair assigned to the profile carrier, with the corresponding private key being kept on the smart card. A user profile 92 and data files 94 are stored in the private area 86 of flash memory 70.

The detailed internal architecture of smart cards varies greatly between smart cards from different manufacturers. For purposes of this discussion, a very simplified view of a typical smart card is used. The smart card 72 has an interface 100, a microcontroller or processor 102, and secured storage 104. The microcontroller 102 is preprogrammed to perform certain cryptographic functions and can read from and write to the secured storage 104. The microcontroller 102 responds to commands sent via the interface 100 and can send data in response to those commands back to the interface.

In this simplified smart card 62, the secured storage 104 contains a passcode 106, a private key 108, and an encryption key 110. Before it will perform any cryptographic functions involving private key 108, the smart card 62 is unlocked by a command sent in via the interface 100 that specifies a passcode matching the stored passcode 106. Once unlocked, the smart card can be instructed by other commands to perform cryptographic functions that involve the use of the private key 108, without making the private key available outside of the smart card.

The programming of the microcontroller 102 is designed to avoid exposing the passcode 106 and the private key 108. Simply, there are no commands that can be issued to the microcontroller 102 via the interface 100 that will reveal the values of the passcode and the private key. In this manner, the smart card prevents a foreign application from ever inadvertently or intentionally mishandling the passcode and keys in a way that might cause them to be intercepted and compromised. In constructing smart cards, manufacturers take additional measures to ensure that the secured storage is inaccessible even when the smart card is disassembled and electronically probed.

Portable Profile Operation

The system described above enables a user to transport his/her profile and data files on a secured portable device from one computer to the next. The user can upload the user profile from the portable device to the computer and automatically configure the computer to his/her likes and preferences. In this manner, every computer "looks and feels" the same to the user, based on that user's settings and preferences.

The profile carrier is configured as a smart card secured flash memory assembly that alternately enables access to the user profile in flash memory when the smart card is present, while disabling access when the smart card is removed. No connection to a server for remote downloading of profiles is necessary, as the portable profile carrier contains all of the information needed by the computer for customized configuration.

To access the user profile, the user assembles the card reader 60 and smart card 62 by inserting the smart card 62 into the slot in the reader 60 to align the contacts with the card interface 66. The user then inserts the assembled carrier into the PCMCIA device reader 58 at the computer 52. Authorization to access the user profile is achieved through a two-phase authentication process. One phase involves user authentication in which the smart card 62 authenticates the user via a passcode challenge. The second phase concerns assembly authentication in which the smart card 62 authenticates the smart card reader 60 as carrying the profile of the user.

Figure 5:
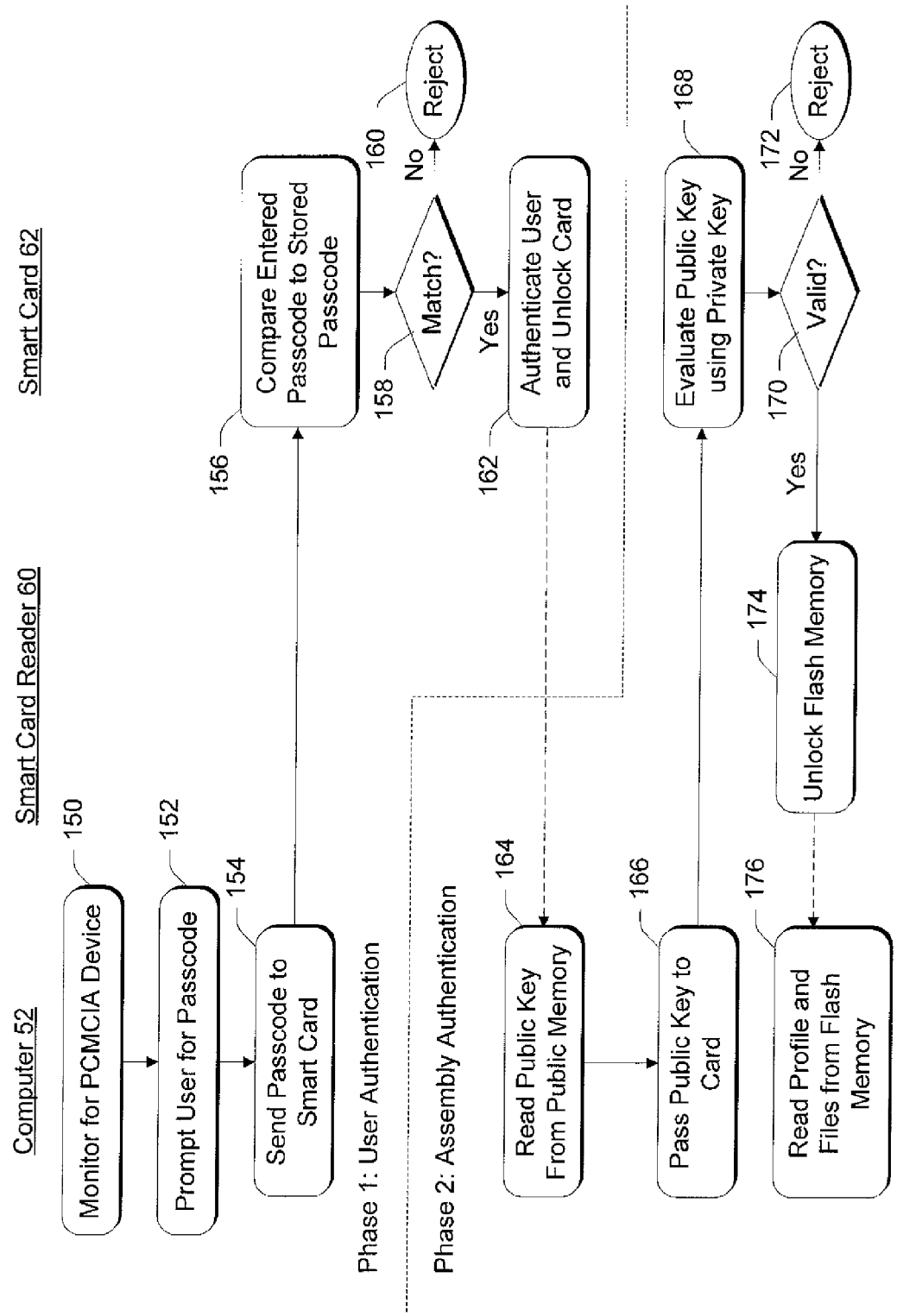
FIG. 5 is a flow diagram showing steps in a two-phase authentication process for accessing user profile and data files carried on the profile carrier The same numbers are used throughout the figures to reference like components and features.

FIG. 5 shows steps in the two-phase authentication process that enables access to the user profile and data files. The steps are performed in a combination of hardware and software resident at the computer 52, smart card reader 60, and smart card 62. The method is also described with additional reference to the system illustrated in FIG. 4.

At step 150, the computer 52 monitors for insertion of a PCMCIA-compatible device in PCMCIA device reader 58. In one implementation, the logon "picoauth.dll" module 80 of operating system 56 continually monitors the PCMCIA device reader 58. When insertion is detected, the picoauth.dll module 80 queries the device to determine whether it is a profile assembly having both flash memory and a smart card. Once the profile assembly is identified, the logon module 80 proceeds with the logon procedure.

At step 152, the computer operating system 56 prompts the user via a dialog box or other type window to enter a passcode, such as a PIN (Personal Identification Number). After the user enters the passcode, the smart card/flash memory driver 82 sends the user-supplied passcode to the smart card 62 via the computer-based PCMCIA device reader 58 and smart card reader 60 (step 154).

The smart card microcontroller 102 compares the user-supplied passcode to the passcode 106 stored in secured storage 104 (step 156). If the two fail to match (i.e., the "no" branch from step 158), the microcontroller 102 rejects the entered passcode and returns a failure notice (step 160). Conversely, if the two match, the user is said to have been authenticated and the microcontroller 102 will now accept commands that involve cryptographic operations involving the private key 108 and the encryption key 110.

In this manner, the smart card is associated with a particular user through the passcode. Only the legitimate user is assumed to know the passcode and hence, only the legitimate user is able to unlock the smart card.

This passcode challenge completes the user authentication phase of the process. The assembly authentication phase is subsequently initiated to determine whether the flash memory device carries the data of the authenticated user. This phase employs public key cryptography to make this determination. As noted above, the composite profile assembly is assigned a pair of complementary public and private keys, with the public key 90 being stored in flash memory 70 on smart card reader 60 and the corresponding private key 108 being stored in the secured storage 104 of the smart card 62.

At step 164, the smart card/flash memory driver 82 reads the public key 90 from the public area 84 of flash memory 70 on the smart card reader 60. The driver 82 passes the public key 90 to the smart card 62 via the computer-based PCMCIA device reader 58 and smart card reader 60 (step 166). The smart card microcontroller 102 runs a process using the public key 90 and the private key 108 from secured storage 104 to determine whether the keys are complementary (step 168). This step determines whether the smart card reader 60 and smart card 62 are associated with one another and form the user's profile carrier, thereby linking the legitimate user to the user profile and files stored in the flash memory of the profile carrier.

If the public key is not valid (i.e., the "no" branch from step 170), the microcontroller 102 rejects the entered public key and returns a failure notice indicating that the card reader does not correspond to the smart card (step 172). On the other hand, assuming the public key checks out (i.e., the "yes" s branch from step 170), the smart card instructs the controller 68 on the smart card reader 60 to enable access to the user profile and data files in the private area 86 of the flash memory 70 (step 174). At this point, the computer is permitted to read the user profile and data files from the flash memory 70 and normal logon processes are continued using the profile data from the flash memory (step 176).

The computer configures the computer according to the user profile. The flash memory is also made available as a peripheral storage device for the computer. The operating system presents an icon or name in a file system user interface to inform the user that the memory is addressable and available.

After the user completes a session at this computer, the user can save any files or other data to the flash memory. The user is then free to remove the profile assembly from the computer and carry it to another computer. The user can then repeat the same operation described above to import his/her profile to the next computer.

The scheme described is secure if the computer 52 can be trusted to correctly pass the public key 90 to the smart card 62, and correctly pass the accepts/reject response from the smart card 62 to the controller 68. To further protect the private area 86 in the smart card reader 60, the contents of the private area 86 can be encrypted (e.g. DES encryption) using a key that can only be obtained from the smart card 62 after the smart card has been successfully unlocked by the user providing the correct passcode. In this case, the computer 52 must send a command to the smart card 62 via the interface 100 to obtain the encryption key 110, which it passes to the controller 68. The controller uses this key to decrypt the user profile 92 and user documents 94 as the computer makes requests to read this data. Similarly when this data is written back to the reader 60, the controller 68 uses the key to encrypt the data before writing it to the private memory area 86. The smart card will only provide the encryption key if it has been previously unlocked, meaning that a user provided the correct passcode.

Storage Card Implementation

The above processes assume that storage card 62 is an IC card or smart card with processing capabilities in addition to memory. As an alternative implementation, the card 62 may be a storage card without processing capabilities. In this arrangement, the storage card 62 stores the passcode or other access credentials in a memory that is accessible by the card reader 60. During logon, the card reader reads the passcode from the storage card 62 and compares it to the user-supplied passcode. If there is a match, the access to the user profile and data files on the flash memory is permitted.

This alternative implementation is not as secure as the smart card-based implementation. However, it still requires user authentication and possession of both components of the profile carrier during logon to gain access to the user profile and data files.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An assembly, comprising:
    a storage device having an interface to communicate with a physical key and having a secure memory to securely store a user profile of a user;
    a physical key to enable access to the user profile when the physical key is passcode-activated and coupled with the interface and to disable access to the user profile when the physical key is removed from the interface,
    wherein in response to the storage device being coupled with a computing device and the physical key being coupled with the interface and the physical key being passcode-activated, the physical key authenticates the user, authenticates the storage device, logs the user onto the computing device, and configures the computing device with user-preferences and user-selected operating system characteristics stored in the user profile.

2. The assembly as recited in claim 1, wherein the storage device securely stores the user's data to be made accessible after the physical key configures the computing device.

3. The assembly as recited in claim 1, wherein the storage device stores a public encryption key, the physical key stores a corresponding private decryption key, and access to the user profile in the secure memory is enabled upon verification that the public key and the private key are associated and the physical key is passcode-activated.

4. A computer system, comprising:
    a computer having a reader for a memory assembly;
    a memory assembly secured by a smart card to interface with the reader, the memory assembly storing a user profile and interfacing with a removable smart card to enable access to the user profile when the smart card is present and activated via a passcode, and to disable access to the user profile when the smart card is removed; and
    wherein in response to the memory assembly being interfaced with the reader and the smart card being present and activated, the smart card authenticates the user, authenticates the user profile, logs the user onto the computer, and configures the computer with user-preferences and operating system characteristics stored in the user profile.

5. The computer system as recited in claim 4, wherein the memory assembly comprises flash memory.

6. The computer system as recited in claim 4, wherein:
    the smart card stores a first key;
    the memory assembly stores a second key that is associated with the first key; and
    the smart card authenticates the second key using the first key, the authentication being a condition for enabling access to the user profile.

7. The computer system as recited in claim 4, wherein the memory assembly comprises a USB-compatible memory.

8. The computer system as recited in claim 4, wherein the memory assembly has a public area and a private area, wherein the private area stores data files of the user.

9. An apparatus, comprising:
a first storage device, including:
   a storage area for storing a profile and a public key of an encryption key pair;
   a first interface for coupling with a computing device;
a second interface;
a second storage device capable of coupling with the second interface, including:
   a storage area for a private key of the encryption key pair;
   an authentication device for verifying a passcode;
wherein the apparatus uploads the profile to the computing device in response to the apparatus being coupled with the computing device, the private key complementing the public key, and the authentication device verifying the passcode; and
wherein the second storage device authenticates the user, authenticates the first storage device, automatically logs the user onto the computing device, and configures the logged on computing device with user-preferences and operating system characteristics from the profile.

10. The apparatus as recited in claim 9, further comprising a driver included in the computing device to detect whether a removable device coupled with the computing device is the first storage device.

11. The apparatus as recited in claim 9, further comprising a logon module included in the computing device to recognize that the apparatus is coupled with the computing device and that the second storage device is coupled with the first storage device, and to log on the user.

* * * * *